United States Patent [19]
Falkiner et al.

[11] Patent Number: 5,764,144
[45] Date of Patent: Jun. 9, 1998

[54] TARPAULIN ALARM SYSTEM

[75] Inventors: Thomas L. Falkiner, Fort Erie; Daniel J. Carter, Ridgeway, both of Canada

[73] Assignee: Itza Snap Inc., Fort Erie, Canada

[21] Appl. No.: 718,984

[22] Filed: Sep. 26, 1996

[51] Int. Cl.$^6$ ................................ B60R 25/10
[52] U.S. Cl. .................. 340/551; 340/426; 340/571
[58] Field of Search ................ 340/426, 425.5, 340/984, 652, 551, 568, 571, 572

[56] References Cited

U.S. PATENT DOCUMENTS

| | | | |
|---|---|---|---|
| 4,222,032 | 9/1980 | Speer | 340/568 |
| 4,253,084 | 2/1981 | Topputo | 340/426 |
| 5,051,744 | 9/1991 | Ewart | 340/984 |
| 5,486,812 | 1/1996 | Todd | 340/542 |
| 5,572,186 | 11/1996 | Traxler et al. | 340/984 |

*Primary Examiner*—Edward Lefkowitz
*Attorney, Agent, or Firm*—Bean, Kauffman & Snyder

[57] ABSTRACT

A tarpaulin alarm system triggered by unsnapping a tarpaulin attachment snap from a snap member includes a hollow housing on which the snap member is mounted and a Hall effect sensor arranged proximate the snap member on a printed circuit board contained within the housing for cooperation with a magnet associated with the attachment snap. The housing is preferably cylindrical in shape for easy mounting in a drilled hole. The printed circuit board is connected to a switched power source external to the housing, and may be wired to a suitable alarm indicator, such as an existing horn. The circuitry includes an oscillator-based timer for providing a delay period after triggering during which the system may be reset by re-attaching the attachment snap to the snap member.

7 Claims, 3 Drawing Sheets

TARPAULIN ALARM SYSTEM

BACKGROUND

A. Field of the Invention

The present invention relates generally to alarm systems, and more particularly to a tarpaulin alarm system activated by the detachment of an attachment snap of a tarpaulin from a corresponding snap member mounted on a vehicle or other object.

B. Description of the Prior Art

Snap-on fabric tarpaulins, or "tarps" as they are commonly known, are widely used to cover boats, pickup truck beds, convertible automobiles, recreational vehicles, tents and the like to conceal property, for example recreational gear or tools, stored therein and protect such property from weather conditions. Snap-on tarps are acknowledged to be substantially ineffective for protecting property from theft, in that they lack suitable locking means. Applicant herein is unaware of any alarm apparatus designed to provide an audible and/or visible alarm indication in response to an attachment snap of a tarp being unsnapped from a corresponding snap member fixed to a vehicle or other object, much less an alarm apparatus of this type which is inexpensive and easy to install.

SUMMARY OF THE INVENTION

Therefore, it is an object of the present invention to provide an alarm system which is triggered by the detachment of a tarp attachment snap from a mounted snap member.

It is another object of the present invention to provide a tarp alarm system which is not readily detectable, visibly or otherwise, by a thief.

It is a further object of the present invention to provide a tarp alarm system which is inexpensive to manufacture.

It is a further object of the present invention to provide a tarp alarm system which may be installed in a simple manner.

It is a further object of the present invention to provide a tarp alarm system which, once triggered, does not rely on moving parts to generate an alarm indication.

It is a further object of the present invention to provide a tarp alarm system which utilizes an existing horn and/or existing lights of a vehicle as alarm indication means.

It is a further object of the present invention to provide a tarp alarm system which is substantially weatherproof.

It is a further object of the present invention to provide a tarp alarm system which may be readily armed or disarmed by an owner.

By way of brief overview, a preferred tarp alarm system of the present invention includes an installation unit having a hollow housing with a male snap member mounted thereon and a printed circuit board contained therein. The printed circuit board includes a Hall effect sensor arranged proximate to the snap member for cooperation with a permanent magnet fixed to a female attachment snap of the tarp for generating a signal in response to detachment of the attachment snap from the snap member. Three wires extend through the housing, two of which connect a d.c. power source via an arm/disarm switch, and one of which carries a signal to alarm indication means, most typically by connection to an existing horn relay. The housing is preferably in the form of an elongated cylinder having external threads for mounting through a hole provided at a location of an existing conventional snap member replaced by the snap member of the installation unit. The alarm circuit includes timed reset means, whereby a delay period is provided during which the alarm system may be reset by re-attaching the attachment snap to the snap member.

BRIEF DESCRIPTION OF THE DRAWINGS

The nature and mode of operation of the present invention will now be more fully described in the following detailed description of the preferred embodiments taken with the accompanying drawing figures, in which.

DETAILED DESCRIPTION OF THE PREFERRED EMBODIMENT

Figure 1:
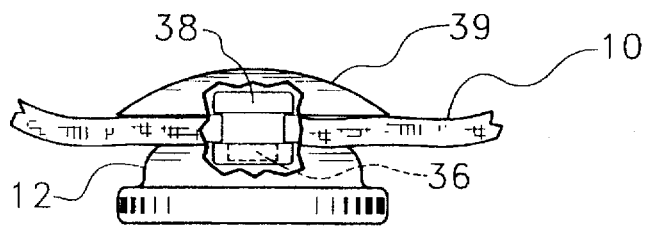
FIG. 1 is an enlarged elevational view, partially sectioned, of a snap member installation unit and a corresponding tarp attachment snap formed in accordance with a preferred alarm system of the present invention.
Figure 2:
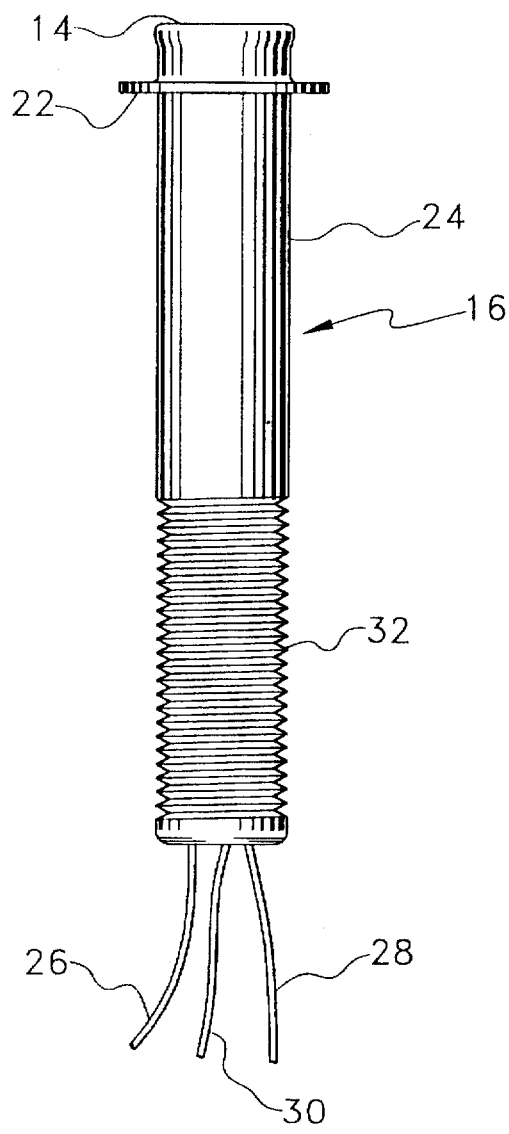
FIG. 2 is a cross-sectional view of the installation unit shown in FIG. 1.
Figure 2:
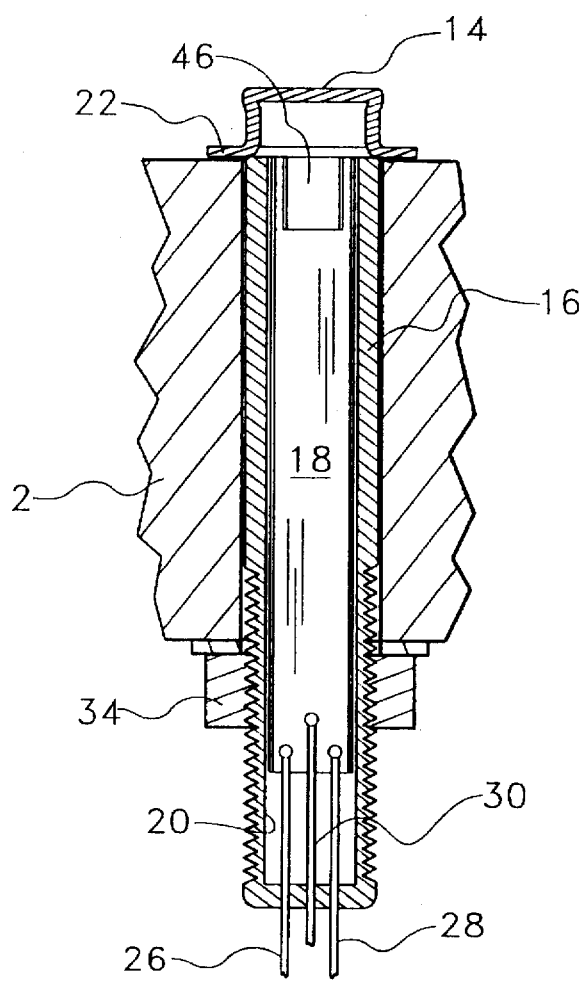

Reference is initially directed to FIG. 1 of the drawings, wherein a tarpaulin 10 (hereinafter "tarp") is shown as including at least one female attachment snap 12 fixed thereto and adapted for detachable mating with a corresponding male snap member 14, which is fixedly mounted to an object 2. The terms "attachment snap" and "snap member" as used herein denote mating parts of a snap coupling, and are not confined to the respective female and male genders shown in FIG. 1, in that an "attachment snap" may be male and a corresponding "snap member" may be female. Object 2 may be any object to which it is desired to attach tarp 10, and is most typically a boat, pickup truck, convertible automobile, tent, or recreational vehicle having a plurality snap members 14 fixedly mounted thereon and arranged such that tarp 10 may be attached to cover the object itself and/or valuables stored within the object. Thus, in order for a thief to steal the object itself or valuables stored therein, one or more attachment snaps 12 must be unsnapped from corresponding snap members 14 to permit access. The tarp alarm system of the present invention, as described below, produces an audible and/or visible alarm indication when attachment snap 12 is detached from corresponding snap member 14.

In an installation unit of the preferred embodiment, snap member 14 is mounted, preferably by water-resistant epoxy, so as to cover a top end of an elongated hollow cylindrical housing 16. A flexible printed circuit board 18, to be described in detail hereinbelow, is contained within housing 16 and may be flexed into a curved condition to conform to inner wall 20 of the housing. Circuit board 18 is permanently fixed to inner wall 20 by glue. Housing 16 may be a predetermined length of PVC tubing, which provides durability and water resistance to protect circuit board 18 therewithin. The outer diameter of housing 16 is chosen to correspond approximately to the diameter of snap member 14, such that a bottom annular flange 22 of snap member 14 extends radially outward beyond housing outer wall 24 at the juncture of the snap member and housing, and the inner diameter and length of housing 16 are chosen to provide sufficient space for circuit board 18, which in a presently preferred construction measures 0.27 inches wide by 2 inches long, and to permit installation of the unit. Respective first, second, and third wire conductors 26, 28, and 30 are arranged to extend through a bottom end of housing 16 and are connected to circuit board 18 as will be described below. Space surrounding wires 26, 28, and 30 is filled with epoxy or the like to form a water-tight seal at the bottom end of housing 16. Consequently, housing 16 is completely water-sealed to prevent moisture from reaching circuit board 18, a feature which is important for outdoor installations, and particularly for boat installations. The installation unit is also durable because it does not have moving parts which are subject to failure.

The cylindrical shape of housing 16 permits simple installation of the unit on object 2 by drilling a matching diameter hole through the object, for instance a side portion of a boat, and sliding the bottom end of the housing into the hole until flange 22 engages a top surface of object 2. In this way, installed snap member 14 is conventional in all aspects of its outward appearance so as to avoid discovery of the alarm system by a would-be thief. Housing 16 is preferably provided with an externally threaded portion 32 adjacent its bottom end to enable the housing to be clamped tightly to object 2 by an adjustable nut 34. As will be appreciated, housing 16 may be manufactured in a wide variety of shapes and sizes to meet a variety of installation requirements.

Attachment snap 12 is provided with means for generating a localized magnetic field in the vicinity of attachment snap 12 which may be detected by sensing means associated with snap member 14, as will be described. The preferred means is a small permanent magnet 36 fixed within an existing rivet 38 which couples a thumb member 39 to attachment snap 12 so as not to interfere with the mating of the attachment snap with snap member 14. A preferred magnet is approximately 2 mm thick by 3 mm in diameter to fit within a rivet of a typical tarp attachment snap construction.

Figure 3A:
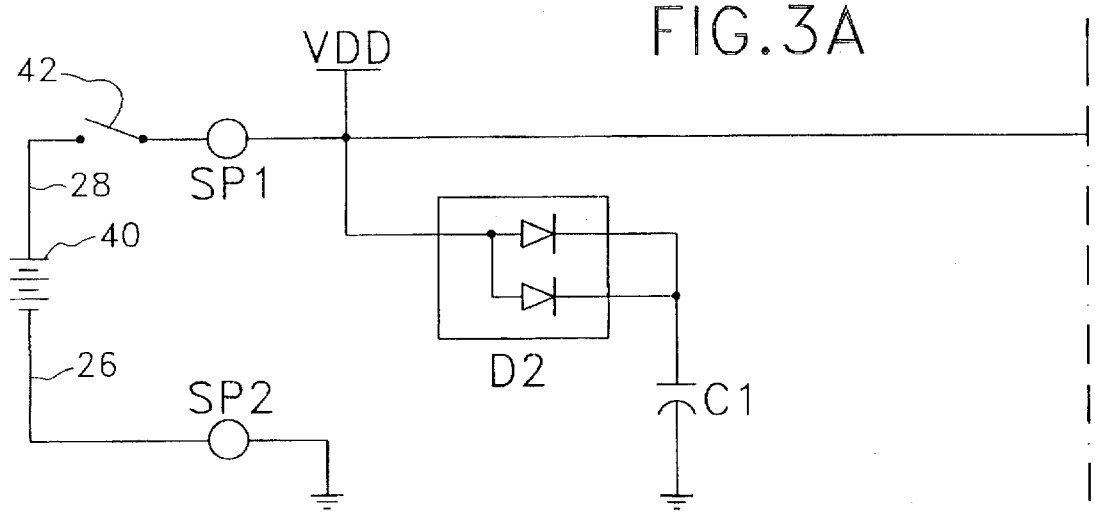
FIGS. 3A and 3B combine to form a schematic diagram of a preferred alarm circuit of the present invention.
Figure 3A:
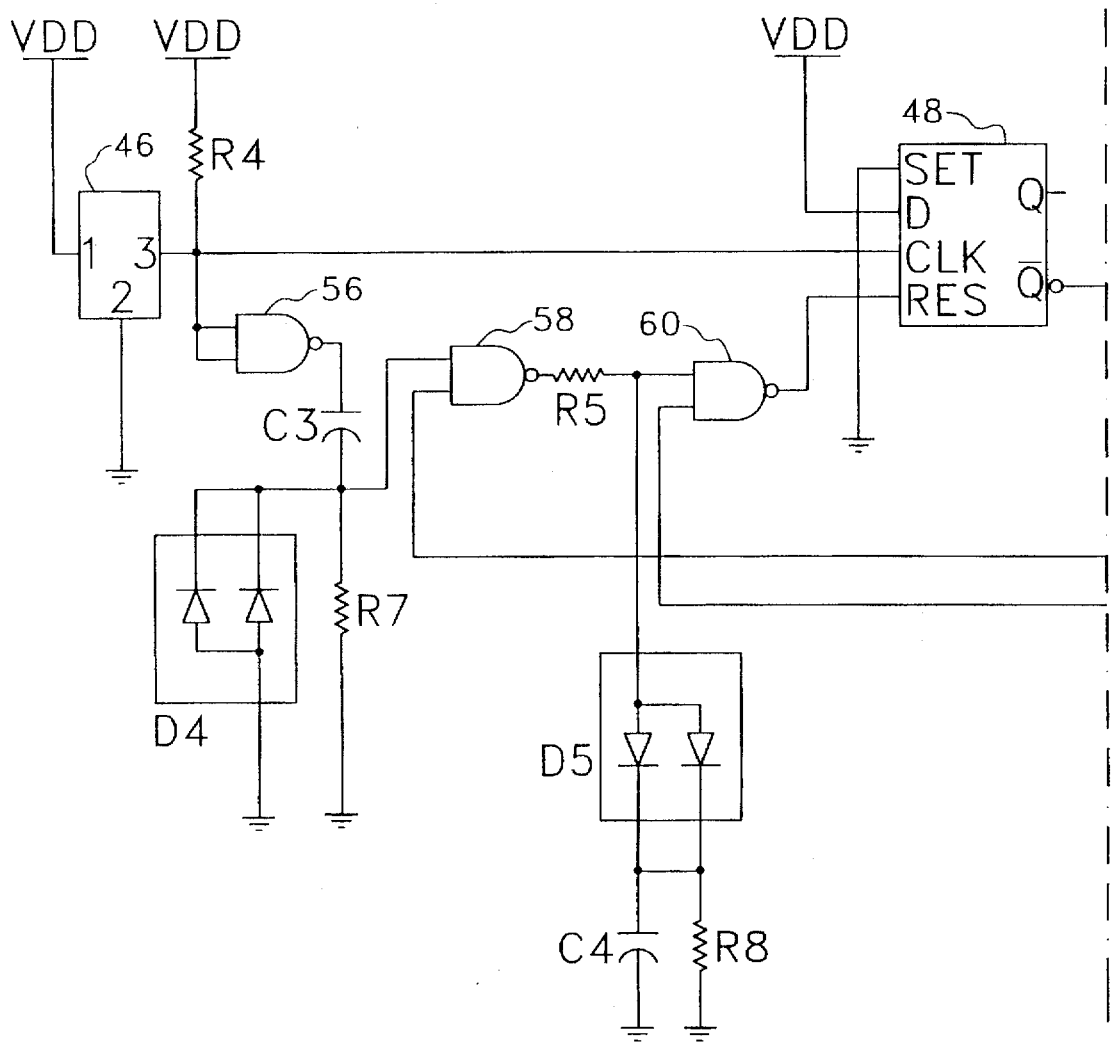
Figure 3B:
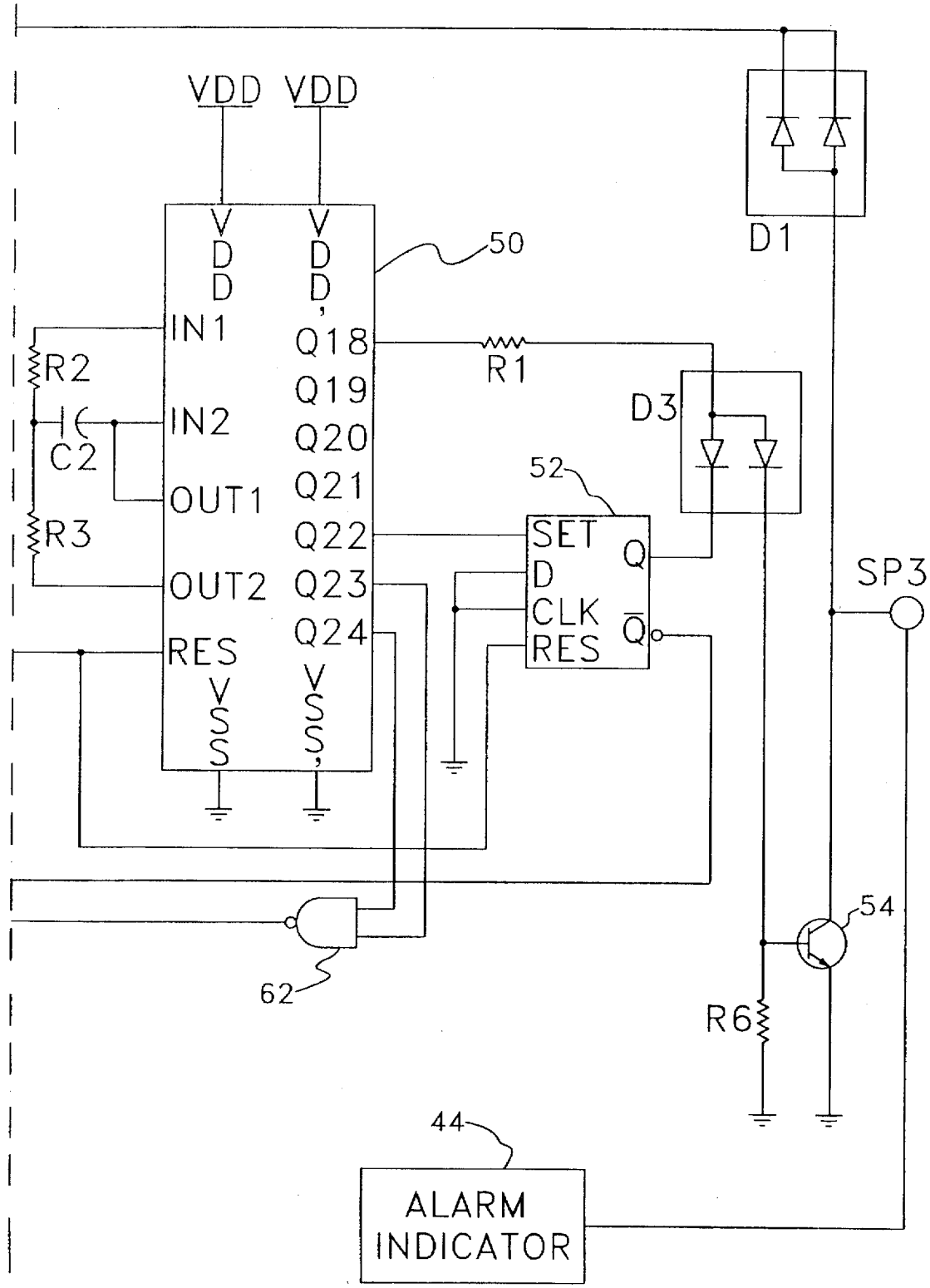

The alarm circuit of the present invention is shown schematically in FIGS. 3A and 3B. Printed circuit board 18 is connected to a d.c. power source 40 by a switch 42 for selectively arming or disarming the system. Power source 40 may provide from 5 to 18 Volts with a quiescent current of approximately 5 mA. Power source 40 and switch 42 are preferably mounted in a hidden location, which may be remote from housing 16, and connected to printed circuit board 18 by first and second wires 26 and 28 secured at solder points SP1 and SP2, respectively.

The circuit includes resistors R1–R8, capacitors C1–C4, and surface mount dual diodes D1–D5 specified as follows:

| | |
|---|---|
| R1 | 4.7 k$\Omega$ |
| R2 | 68 k$\Omega$ |
| R3 | 33 k$\Omega$ |
| R4, R5, R6 | 22 k$\Omega$ |
| R7 | 100 k$\Omega$ |
| R8 | 1 M$\Omega$ |
| C1 | 1 $\mu$F |
| C2 | 100 pF |
| C3 | .1 $\mu$F |
| C4 | 1 $\mu$F |
| D1–D5 | Motorola BAW56 |

Wire 30 is connected to printed circuit board 18 at solder point SP3 and runs to a suitable alarm indication means 44. Where the system is installed in a boat or other vehicle having an electric horn, wire 30 may simply be connected to the existing horn relay. Wire 30 may also be connected to an existing headlamp relay for visible alarm indication.

A Hall effect sensor 46 is provided at an end of printed circuit board 18 adjacent snap member 14, whereby sensor 46 cooperates with magnet 36 fixed to attachment snap 12.

A suitable Hall effect sensor for use in the preferred embodiment of the present invention is the Allegro A3141 having an output at pin 3 thereof.

The output of Hall effect sensor 46 is provided to the clock input CLK of a first 4013 dual D flip-flop 48, which has its SET input at ground and its D input at high. As a result, flip-flop 48 may function in its clocked mode when reset input RES is held low, and in its direct mode when the reset input RES is high.

The $\overline{Q}$ output of first flip-flop 48 is delivered to the RESET input of an oscillator-based timer 50, preferably a Motorola MC14521 24-stage frequency divider. The input circuit of timer 50 is configured for RC oscillator function, with stage Q22 being reached after approximately 25 seconds and stage Q24 being reached after approximately 90 seconds.

A second 4013 dual D flip-flop 52 is arranged to receive the Q22 output of timer 50 at its SET input, and has its RESET input connected to receive the $\overline{Q}$ output of first flip-flop 48. The Q output of second flip-flop 52 is connected through dual diode D3 to signal transistor 54, with output Q18 from timer 50 generating a 0.5 Hz pulse. Signal transistor 54 may be a Motorola MMBT4401LT1 surface mount transistor, which is capable of driving a 200 mA current sufficient for a standard 60 Ohm, 12 Volt relay.

A first NAND gate 56 is connected to receive the output signal from Hall effect sensor 46 at both inputs and provide its output signal to a second NAND gate 58. Second NAND gate 58 also receives the $\overline{Q}$ output from second flip-flop 52. The output from second NAND gate 58 is input to a third NAND gate 60, which also receives the output of a fourth NAND gate 62. The Q23 and Q24 outputs from timer 50 are provided as inputs to fourth NAND gate 62. The first through fourth NAND gates 56, 58, 60, and 62 are preferably 4011 quad 2-input NAND gates.

The alarm system of the present invention is armed by closing switch 42. Upon power-up, the reset input RES to first flip-flop 48 is driven high for direct mode, thereby driving the reset inputs to timer 50 and second flip-flop 52 high. As will be described, the alarm is triggered by detachment of attachment snap 12 from snap member 14, however a delay period is provided during which the alarm signal is prevented from reaching alarm indication means 44, and the system may be reset at any time during the delay period by re-attaching the attachment snap to the snap member.

When the alarm is triggered, the output signal from Hall effect sensor 46 goes high as magnet 36 is moved away from proximity to Hall effect sensor 46 incident to detachment of attachment snap 12 from snap member 14. The output signal causes the outputs of successive NAND gates 56, 58, and 60 to change, thereby changing first flip-flop 48 to a clocked mode wherein the signal from Hall effect sensor 46 at its clock input CLK causes first flip-flop output $\overline{Q}$ to go low to initiate counting by timer 50.

When timer 50 reaches stage Q22, after a delay period of approximately 25 seconds from reset, the SET input of second flip-flop 52 is driven high, resulting in a high output at Q. The signal causes transistor 54 to become conductive for communication with alarm indication means 44. Where alarm indication means 44 is a horn, the 0.5 Hz pulse frequency from timer output Q18 causes the alarm to sound 1 second on, 1 second off. Once timer reaches stage Q24, after approximately 90 seconds from reset, the output of fourth NAND gate 62 is driven low such that the output of third NAND gate 60 goes high to reset the system.

If attachment snap 12 is re-attached to snap member 14 during the initial 25-second delay period before timer 50 reaches stage Q22, the output from Hall effect sensor 46 goes low, causing the outputs of successive NAND gates 56, 58, and 60 to change to reset the system. However, once timer 50 reaches stage Q22, the system may not be reset by snap re-attachment because the $\bar{Q}$ output from second flip-flop 52 goes low and prevents second NAND gate 58 from changing in response to a changed signal originating from Hall effect sensor 46. Consequently, once alarm indication means 44 is signaled and before the 90-second automatic reset occurs, switch 42 must be used to silence or halt the alarm indication generated by the alarm indication means.

Finally, it will be understood that more than one installation unit may be installed and connected between power source 40 and alarm indication means 44 to provide alarm protection at selected snap locations, or at every snap location, as desired.

What is claimed is:

1. An installation unit for use in a tarpaulin alarm system comprising:

a hollow housing;

a snap member mounted on said housing for mating with a tarpaulin attachment snap;

a circuit board contained within said housing, said circuit board having a Hall effect sensor thereon arranged proximate to said snap member for generating a signal in response to detachment of said attachment snap from said snap member;

first and second conductors extending into said housing and connected to said circuit board for connecting a power source to said circuit board; and a third conductor connected to said circuit board and extending out of said housing for transmitting said signal to an alarm indication means responsive to said signal.

2. The installation unit according to claim 1, wherein said housing is an elongated cylinder.

3. The installation unit according to claim 2, wherein said cylindrical housing includes an externally threaded portion.

4. The installation unit according to claim 2, wherein said circuit board is flexible to fit within said cylindrical housing.

5. The installation unit according to claim 2, wherein said snap member is mounted at one end of said housing, and said first, second, and third conductors extend through another end of said housing opposite said one end.

6. The installation unit according to claim 1, wherein said housing is water-sealed.

7. The installation unit according to claim 2, further comprising an annular flange at a juncture of said snap member and said housing.

* * * * *